US008550340B2

(12) United States Patent
Schutzmann et al.

(10) Patent No.: US 8,550,340 B2
(45) Date of Patent: Oct. 8, 2013

(54) ELONGATED SECURITY FEATURE COMPRISING MACHINE-READABLE MAGNETIC REGIONS

(75) Inventors: Jurgen Schutzmann, Pfaffenhofen (DE); Stefan Bichlmeier, Unterhaching (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 13/496,552

(22) PCT Filed: Sep. 13, 2010

(86) PCT No.: PCT/EP2010/005589
§ 371 (c)(1), (2), (4) Date: Mar. 16, 2012

(87) PCT Pub. No.: WO2011/032671
PCT Pub. Date: Mar. 24, 2011

(65) Prior Publication Data
US 2012/0168515 A1 Jul. 5, 2012

(30) Foreign Application Priority Data
Sep. 21, 2009 (DE) ......................... 10 2009 042 022

(51) Int. Cl.
*G06Q 40/00* (2012.01)
*G06K 19/06* (2006.01)

(52) U.S. Cl.
USPC ............ 235/379; 235/449; 235/493; 235/494

(58) Field of Classification Search
USPC .................. 235/375, 379, 449, 488, 493, 494
See application file for complete search history.

(56) References Cited

U.S. PATENT DOCUMENTS 5,354,099 A 10/1994 Kaule et al.
5,614,824 A * 3/1997 Dames et al. ................. 324/239
5,631,039 A * 5/1997 Knight et al. ..................... 427/7
5,688,587 A * 11/1997 Burchard et al. ............. 442/330
6,126,076 A * 10/2000 Lazzerini ...................... 235/487
6,127,034 A * 10/2000 Chorley ........................ 428/375
6,146,773 A * 11/2000 Kaule ........................... 428/611
6,255,948 B1 * 7/2001 Wolpert et al. ............ 340/572.8

(Continued)

FOREIGN PATENT DOCUMENTS

DE 19650759 A1 6/1998
DE 10248954 A1 4/2004

(Continued)

OTHER PUBLICATIONS

International Search Report, International Application No. PCT/EP2010/005589, 3 pages, Jan. 27, 2011.

(Continued)

*Primary Examiner* — Tuyen K Vo
(74) *Attorney, Agent, or Firm* — Lathrop & Gage LLP

(57) ABSTRACT

The present invention relates to an elongated security element (40) for security papers, value documents and the like, having a longitudinal direction and, perpendicular to the longitudinal direction, a transverse direction, and having, arranged on a support, a magnetic layer (44) that includes machine-readable magnetic regions. According to the present invention, the magnetic layer comprises a plurality of frame-shaped magnet elements (44) that include the machine-readable magnetic regions and that are arranged along the longitudinal direction of the elongated security element (40).

20 Claims, 4 Drawing Sheets

(56) References Cited

U.S. PATENT DOCUMENTS

Figure 1:
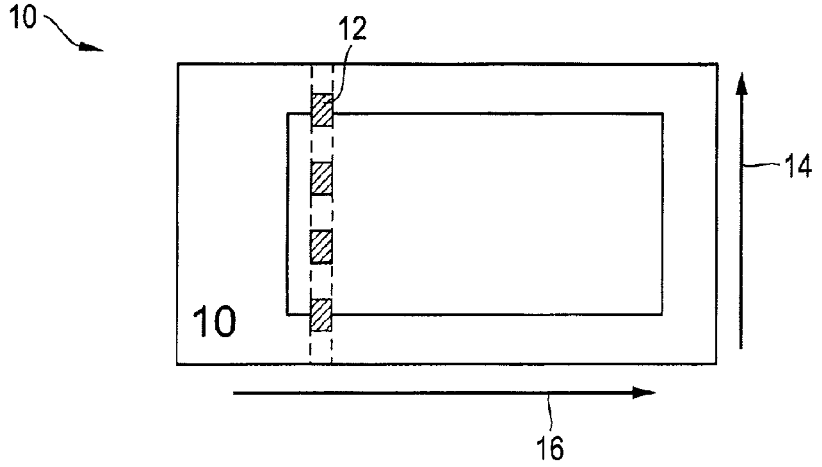

| | | | | |
|---|---|---|---|---|
| 6,343,745 | B1 * | 2/2002 | Bohm et al. | 235/493 |
| 6,454,166 | B1 * | 9/2002 | Stenzel et al. | 235/449 |
| 7,040,663 | B1 * | 5/2006 | Plaschka et al. | 283/72 |
| RE39,490 | E * | 2/2007 | Cote et al. | 340/572.8 |
| 7,667,894 | B2 | 2/2010 | Hoffmuller | |
| 7,703,811 | B2 * | 4/2010 | Isherwood | 283/82 |
| 7,728,931 | B2 | 6/2010 | Hoffmuller | |
| 7,808,605 | B2 | 10/2010 | Hoffmuller | |
| 7,986,459 | B2 | 7/2011 | Kaule | |
| 8,083,894 | B2 | 12/2011 | Gruszczynski | |
| 8,149,511 | B2 | 4/2012 | Kaule | |
| 8,276,826 | B2 * | 10/2012 | Schutzmann et al. | 235/493 |
| 2002/0056758 | A1 * | 5/2002 | Stenzel et al. | 235/493 |
| 2006/0097512 | A1 * | 5/2006 | Isherwood | 283/72 |
| 2007/0165182 | A1 | 7/2007 | Hoffmuller | |
| 2007/0211238 | A1 | 9/2007 | Hoffmuller | |
| 2007/0216518 | A1 | 9/2007 | Hoffmuller | |
| 2007/0229928 | A1 | 10/2007 | Hoffmuller | |
| 2007/0241553 | A1 | 10/2007 | Heim | |
| 2007/0246933 | A1 | 10/2007 | Heim | |
| 2007/0274559 | A1 | 11/2007 | Depta | |
| 2008/0014378 | A1 | 1/2008 | Hoffmuller | |
| 2008/0054621 | A1 | 3/2008 | Burchard | |
| 2008/0079257 | A1 | 4/2008 | Fessl | |
| 2008/0088859 | A1 | 4/2008 | Depta | |
| 2008/0160226 | A1 | 7/2008 | Kaule | |
| 2008/0163994 | A1 | 7/2008 | Hoppe | |
| 2008/0198468 | A1 | 8/2008 | Kaule | |
| 2008/0216976 | A1 | 9/2008 | Ruck | |
| 2008/0250954 | A1 | 10/2008 | Depta | |
| 2008/0258456 | A1 | 10/2008 | Rahm | |
| 2009/0001709 | A1 | 1/2009 | Kretschmar | |
| 2009/0008923 | A1 | 1/2009 | Kaule | |
| 2009/0008926 | A1 | 1/2009 | Depta | |
| 2009/0102605 | A1 | 4/2009 | Kaule | |
| 2009/0115185 | A1 | 5/2009 | Hoffmuller | |
| 2009/0236061 | A1 | 9/2009 | Gruszczynski | |
| 2009/0297805 | A1 | 12/2009 | Dichtl | |
| 2009/0322071 | A1 | 12/2009 | Dichtl | |
| 2010/0052307 | A1 | 3/2010 | Schutzmann et al. | |
| 2010/0065639 | A1 | 3/2010 | Schutzmann et al. | |
| 2010/0175843 | A1 | 7/2010 | Gregarek | |
| 2010/0177094 | A1 | 7/2010 | Kaule | |
| 2010/0182221 | A1 | 7/2010 | Kaule | |
| 2010/0194091 | A1 | 8/2010 | Heim | |
| 2010/0194532 | A1 | 8/2010 | Kaule | |
| 2010/0196587 | A1 | 8/2010 | Keller | |
| 2010/0207376 | A1 | 8/2010 | Heim | |
| 2010/0208036 | A1 | 8/2010 | Kaule | |
| 2010/0307705 | A1 | 12/2010 | Rahm | |
| 2010/0308570 | A1 | 12/2010 | Heim | |
| 2010/0320742 | A1 | 12/2010 | Hoffmuller | |
| 2011/0007374 | A1 | 1/2011 | Heim | |
| 2011/0012337 | A1 | 1/2011 | Heim | |
| 2011/0027538 | A1 | 2/2011 | Hoffmann | |
| 2011/0045248 | A1 | 2/2011 | Hoffmuller | |
| 2011/0069360 | A1 | 3/2011 | Dichtl | |
| 2011/0079997 | A1 | 4/2011 | Heim | |
| 2011/0091665 | A1 | 4/2011 | Heim | |
| 2011/0095518 | A1 | 4/2011 | Hoffmuller | |
| 2011/0101670 | A1 | 5/2011 | Heim | |
| 2011/0109078 | A1 | 5/2011 | Hoffmuller | |
| 2011/0114733 | A1 | 5/2011 | Heim | |
| 2011/0157183 | A1 | 6/2011 | Kaule | |
| 2012/0126525 | A1 | 5/2012 | Dorfler | |
| 2012/0168515 | A1 | 7/2012 | Schutzmann | |
| 2012/0170124 | A1 | 7/2012 | Fuhse | |

FOREIGN PATENT DOCUMENTS

| | | | |
|---|---|---|---|
| EP | 0516790 | B1 | 12/1992 |
| EP | 0659587 | B1 | 6/1995 |
| EP | 0824405 | B1 | 2/1998 |
| EP | 0961996 | B1 | 12/1999 |
| EP | 1545902 | B1 | 6/2005 |
| EP | 1591398 | B1 | 11/2005 |
| GB | 2394696 | A | 5/2004 |
| WO | WO 96/04143 | A1 | 2/1996 |
| WO | WO 96/35586 | | 11/1996 |
| WO | WO 2004/028825 | | 4/2004 |
| WO | WO 2004/062943 | A2 | 7/2004 |
| WO | WO 2005105473 | | 11/2005 |
| WO | WO 2005105474 | | 11/2005 |
| WO | WO 2005105475 | | 11/2005 |
| WO | WO 2005108106 | | 11/2005 |
| WO | WO 2005108108 | | 11/2005 |
| WO | WO 2005108110 | | 11/2005 |
| WO | WO 2006005434 | | 1/2006 |
| WO | WO 2006015733 | | 2/2006 |
| WO | WO 2006018171 | | 2/2006 |
| WO | WO 2006018172 | | 2/2006 |
| WO | WO 2006040069 | | 4/2006 |
| WO | WO 2006056342 | | 6/2006 |
| WO | WO 2006072380 | | 7/2006 |
| WO | WO 2006087138 | | 8/2006 |
| WO | WO 2006099971 | | 9/2006 |
| WO | WO 2006119896 | | 11/2006 |
| WO | WO 2006128607 | | 12/2006 |
| WO | WO 2007006445 | | 1/2007 |
| WO | WO 2007006455 | | 1/2007 |
| WO | WO 2007076952 | | 7/2007 |
| WO | WO 2007079851 | | 7/2007 |
| WO | WO 2007115648 | | 10/2007 |
| WO | WO 2008/000350 | | 1/2008 |
| WO | WO 2008/000351 | | 1/2008 |
| WO | WO 2008/049533 | | 5/2008 |
| WO | WO 2008/061636 | | 5/2008 |
| WO | WO 2008/061707 | A1 | 5/2008 |
| WO | WO 2008/061729 | A1 | 5/2008 |
| WO | WO 2008/071325 | | 6/2008 |
| WO | WO 2009/000527 | | 12/2008 |
| WO | WO 2009/000528 | | 12/2008 |
| WO | WO 2009/000529 | | 12/2008 |
| WO | WO 2009/000530 | | 12/2008 |
| WO | WO 2009/012893 | | 1/2009 |
| WO | WO 2009/024265 | | 2/2009 |
| WO | WO 2009/080262 | | 7/2009 |
| WO | WO 2009/080263 | | 7/2009 |
| WO | WO 2009/083146 | | 7/2009 |
| WO | WO 2009/083151 | | 7/2009 |
| WO | WO 2009/090676 | A1 | 7/2009 |
| WO | WO 2009/100831 | | 8/2009 |
| WO | WO 2009/100869 | | 8/2009 |
| WO | WO 2009/109291 | | 9/2009 |
| WO | WO 2009/121578 | | 10/2009 |
| WO | WO 2009/149831 | | 12/2009 |
| WO | WO 2009/149833 | | 12/2009 |
| WO | WO 2009/156079 | | 12/2009 |
| WO | WO 2010/000470 | | 1/2010 |
| WO | WO 2010/003646 | | 1/2010 |
| WO | WO 2010/028739 | | 3/2010 |
| WO | WO 2011/012281 | | 2/2011 |
| WO | WO 2011/032665 | | 3/2011 |
| WO | WO 2011/032671 | | 3/2011 |

OTHER PUBLICATIONS

International Preliminary Report on Patentability, International Application No. PCT/EP2010/005589, 7 pages, May 10, 2012, English Translation.

* cited by examiner

ELONGATED SECURITY FEATURE COMPRISING MACHINE-READABLE MAGNETIC REGIONS

CROSS-REFERENCE TO RELATED APPLICATIONS

This application is the U.S. National Stage of International Application No. PCT/EP2010/005589, filed Sep. 13, 2010, which claims the benefit of German Patent Application DE 10 2009 042 022.3, filed Sep. 21, 2009, both of which are hereby incorporated by reference to the extent not inconsistent with the disclosure herewith.

The present invention relates to an elongated security element for security papers, value documents and the like, having a longitudinal direction and, perpendicular to the longitudinal direction, a transverse direction, and having, arranged on a support, a magnetic layer that includes machine-readable magnetic regions. The invention further relates to a method for manufacturing such a security element, and a data carrier that is equipped accordingly.

For protection, data carriers, such as value or identification documents, but also other valuable articles, such as branded articles, are often provided with security elements that permit the authenticity of the data carrier to be verified, and that simultaneously serve as protection against unauthorized reproduction. The security elements are developed, for example, in the form of a security thread that is completely or partially embedded in a banknote.

To facilitate an automatic authenticity check and, if applicable, further sensor-based detection and processing of the documents provided therewith, the security elements are often provided with machine-readable codes. One example of a machine-readable security element for banknotes is a security thread having machine-readable magnetic regions whose information content, in the authenticity check, can be detected and analyzed by the magnet sensor of a banknote processing system. Here, in known embodiments, the detection of the magnetic regions can be problematic, for example when, in the chosen transport direction of the banknotes, a sensor of a track-based magnet sensor encounters a non-magnetic gap between the magnetic regions.

Also the provision of machine-readable magnetic regions often poses limiting conditions for the visually visible design of a security thread, for example because the space available for visual design elements is limited, or because the magnetic material impairs the transparency of inverse lettering regions.

Proceeding from this, the object of the present invention is to specify a generic security element that avoids or diminishes the disadvantages of the background art. In particular, it is intended to combine easy and reliable detection of the machine-readable magnetic regions with a visually attractive appearance and great design freedom for the designer.

This object is solved by the security element having the features of the main claim. A method for manufacturing such a security element and a data carrier having such a security element are specified in the coordinated claims. Developments of the present invention are the subject of the dependent claims.

According to the present invention, the magnetic layer in a security element of the kind mentioned above comprises a plurality of frame-shaped magnet elements that include the machine-readable magnetic regions, and that are arranged along the longitudinal direction of the elongated security element. Here, a security element is referred to as elongated when its dimension in the longitudinal direction is more than twice as large as its dimension in the transverse direction. Here, in typical elongated security elements, such as a security thread, security band or security strip, the longitudinal direction is the main axis of the thread, band or strip, or the running direction of the thread, band or strip. Here, the relationship of dimension in the longitudinal direction to dimension in the transverse direction is usually significantly greater than 2 and is normally between about 3.5 and about 40.

The frame-shaped magnet elements are preferably developed to be rectangular and exhibit only linear inner and outer borders, in other words especially no curved, serrated or crooked borders. Advantageously, the borders of the frame-shaped magnet elements extend only either parallel or perpendicular to the longitudinal direction of the elongated security element.

In a variant of the present invention, the frame-shaped magnet elements form, in some regions, open magnet frames that are either immediately connected to one another or arranged spaced apart. Currently, however, the variant of the present invention in which the frame-shaped magnet elements form spaced-apart, closed magnet frames is particularly preferred.

In all embodiments, the frame-shaped magnet elements are advantageously each arranged around further security features, the frame-shaped magnet elements forming, in the currently particularly preferred variant, closed magnet frames that enclose the further security features, such that said security features lie in the magnet-free inner region of the magnet frames. As further security features, especially see-through regions having a piece of see-through information may be considered, which can be formed, for example, by inverse pattern regions, such as inverse lettering or other inverse motifs. The see-through regions especially constitute transparent or semitransparent regions in otherwise opaque layers and can be formed, for example, by gaps in a colored opaque layer or by demetallizing a metal layer.

The piece of see-through information can be a positive depiction in which the information to be depicted, for example a letter string, is formed by the opaque regions, but it can also be an inverse depiction in which the information to be depicted is formed by gaps in the opaque regions. The piece of see-through information can also comprise a combination of a positive and inverse depiction, or can depict a geometric or abstract pattern in which it often cannot be established whether the piece of information is present in a positive depiction or an inverse depiction.

Also optically variable security features may, according to the present invention, be considered as further security features. The optically variable security features can especially be color-shifting thin-film elements, liquid crystal coatings, optically variable pigments, diffraction patterns, such as holograms, or also optically variable coatings that exhibit a combination of color-variable and color-constant regions.

The frame-shaped magnet elements preferably exhibit a remanent line flux between 120 nWb/m and 500 nWb/m. Here, the remanent line flux is the magnetic flux per unit length that is emitted from the edge of an elongated security element according to the present invention. If one multiplies the remanent line flux with the length of 1 m, one obtains the total flux that is emitted from 1 m of the elongated security element.

In a preferred specific embodiment, the frame-shaped magnet elements exhibit along the longitudinal direction a ridge width between 0.1 mm and 1.5 mm, preferably between 0.2 mm and 0.4 mm. Along the transverse direction, the ridge width is advantageously between 0.1 mm and 4 mm, preferably about 1 mm.

In a development of the present invention, outside the frame-shaped magnet elements are arranged visually perceptible characters, patterns or codes, especially visually perceptible see-through regions or color motifs. Here, too, the see-through regions can be formed, for example, by inverse pattern regions, such as inverse lettering or other inverse motifs, or also by appropriate positive pattern regions.

In an advantageous variant of the present invention, the frame-shaped magnet elements are imprinted on a data carrier that itself is not part of the security element. For example, the magnetic layer having the frame-shaped magnet elements can be imprinted on a security paper, a security document or a value document. It is understood that the region of the data carrier that is printed on with the frame-shaped magnet elements becomes, due to the printing, a part of the elongated security element according to the present invention. In particular, the data carrier can be a paper banknote having a substrate composed of paper, especially cotton paper, a polymer banknote having a substrate composed of a plastic material, or a foil-composite banknote. Of course also paper that includes a portion x of polymer material in the range from $0<x<100$ wt. % can be used as the substrate for the data carrier provided for the imprint of the frame-shaped magnet elements. If the data carrier is a substrate composed of plastic material, then especially plastic foils composed of polyethylene (PE), polyethylene terephthalate (PET), polybutylene terephthalate (PBT), polyethylene naphthalate (PEN), polypropylene (PP), polyamide (PA) or monolayer composite substrates composed of these plastic materials are preferred. Further, the substrate can be developed as a multilayer foil composite, especially as a composite of multiple different plastic foils (composite laminate) or as a paper-foil composite. Here, the foils of the composite can be formed, for example, from the above-mentioned plastic materials. Such a composite is distinguished by an extraordinarily high stability, which is of great advantage for the durability of the security element. These composite materials can also be used with great advantage in certain climate regions of the earth.

In a particularly preferred variant of the present invention, the paper-foil-composite exhibits an interior base paper and two exterior foil plies, as described in greater detail in publication EP 1 545 902 B1, the disclosure of which is incorporated in the present description by reference. Also the inverse structure of a paper-foil composite in which an interior foil is provided with two exterior paper plies is advantageous.

In general, it is also to be noted that, in the multilayer foil composite substrates, the frame-shaped magnet elements can be arranged on/in the interior or exterior layer. This applies both to the variants of the present invention having magnet elements that are imprinted on, and to security elements according to the present invention having a support substrate.

In another, likewise advantageous variant of the present invention, the security element includes, as the support, a plastic support foil on which the frame-shaped magnet elements are arranged. In an expedient embodiment, here, the frame-shaped magnet elements occupy the entire width of the support foil in the transverse direction.

Figure 4:
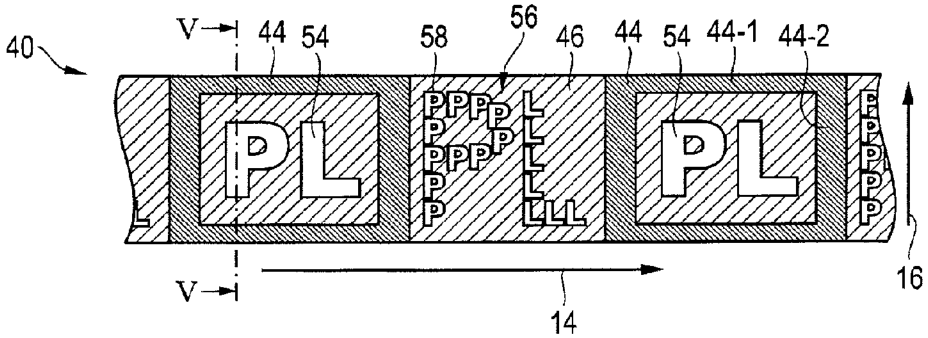
Figure 5:
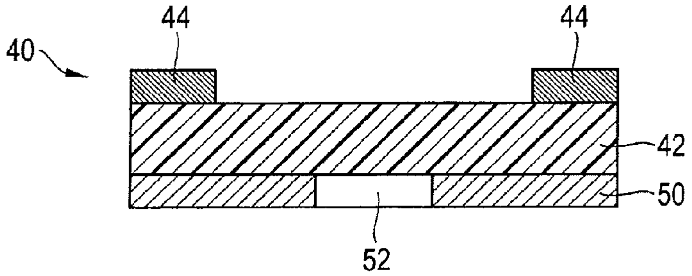

In an advantageous embodiment, the frame-shaped magnet elements are each arranged around further security features, and the frame-shaped magnet elements and the further security features are arranged on opposing sides of the support foil. If the magnet elements and the further security features do not lie in the same plane, then the specification that the frame-shaped magnet elements are to be arranged around the further security features refers to the projection of the magnet elements into the plane of the further security features. Thus, for example, the magnet frames 44 in FIGS. 4 and 5 are, according to the parlance of the present description, arranged around the inverse lettering 54 because the projection of the magnet frames 44 into the plane of the thin-film element 50 is arranged around the inverse lettering 54. Accordingly, the top view in FIG. 4 shows that the inverse lettering 54 is enclosed by the magnet frames 44 and lies within the frames 44.

Preferably there are arranged outside the frame-shaped magnet elements visually perceptible characters, patterns or codes, especially visually perceptible see-through regions or color motifs, that occupy substantially the entire width of the support foil in the transverse direction. Here, the formulation “substantially the entire width of the support foil” accounts for the fact that not all motifs can extend to the edges of the support. For example, inverse characters must always maintain a certain distance from the edges of the support foil in order to still be well recognizable as such. However, what is important is that the support foil width that is usable for the motifs not be limited by the magnetic layer in the region outside the frame-shaped magnet elements. In particular, the motifs, in other words the visually perceptible characters, patterns or codes, can exhibit, in the transverse direction of the support foil, a dimension that is larger than the width of the support foil minus twice the ridge width of the frame-shaped magnet elements along the longitudinal direction of the support foil.

The security element is preferably a security thread, a security band, a security strip or a security thread imprinted on a data carrier.

The present invention also comprises a method for manufacturing a security element of the kind described above, in which a magnetic layer is arranged on a support, the magnetic layer being developed having a plurality of frame-shaped magnet elements that include the machine-readable magnetic regions, and that are arranged along the longitudinal direction of the elongated security element.

Here, in an advantageous variant of the present invention, the magnetic layer having the plurality of frame-shaped magnet elements is imprinted on a data carrier that itself is not part of the security element.

In another, likewise advantageous variant of the present invention, the method comprises the steps:

providing a plastic support foil having a longitudinal direction and, perpendicular to the longitudinal direction, a transverse direction, and arranging the magnetic layer having the plurality of frame-shaped magnet elements on the support foil.

In both variants, the frame-shaped magnet elements are preferably each arranged around further security features, the frame-shaped magnet elements particularly preferably being developed as closed magnet frames that include the further security features.

In the second mentioned variant of the present invention, the frame-shaped magnet elements and the further security features are advantageously arranged on opposing sides of the support foil. According to the kind of security feature, the further security features can be imprinted, vapor deposited or applied in some other manner known to the person skilled in the art.

The present invention further comprises a data carrier, especially a value document, such as a banknote, a passport, a certificate, an identification card or the like, that is furnished with a security element of the kind described. The data carrier can also be a continuous material, such as a continuous roll material for security threads.

Furthermore, the security element according to the present invention can advantageously also be transferred to a data carrier through a transfer method (e.g. hot stamping).

Further exemplary embodiments and advantages of the present invention are explained below by reference to the drawings, in which a depiction to scale and proportion was dispensed with in order to improve their clarity. The different exemplary embodiments are not limited to the use in the form specifically described, but rather can also be combined with one another.

Figure 2:
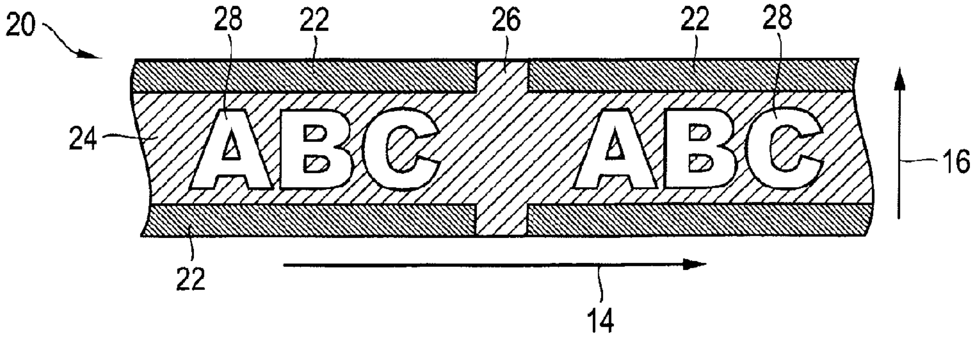
Fig. 2 Prior Art
Figure 3:
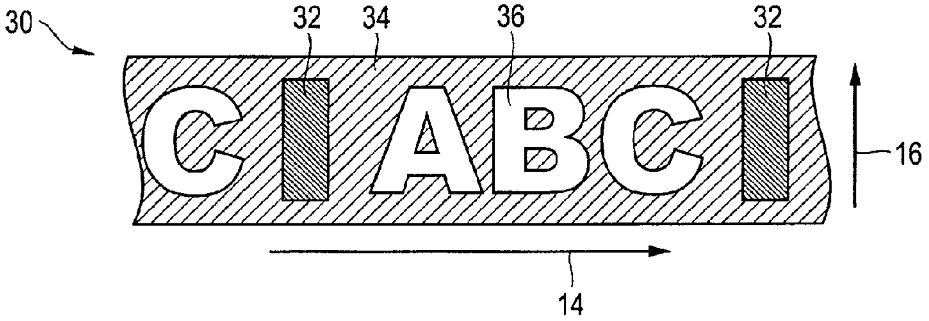
Fig. 3 Prior Art
Figure 6:
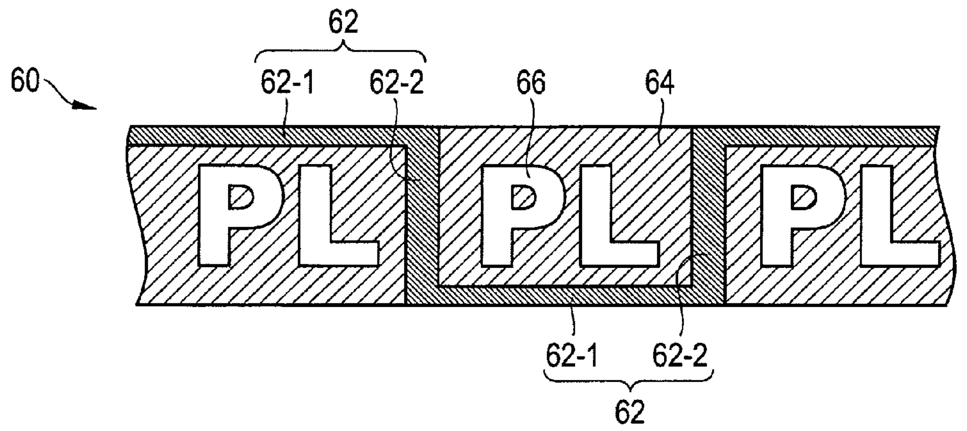
Figure 7:
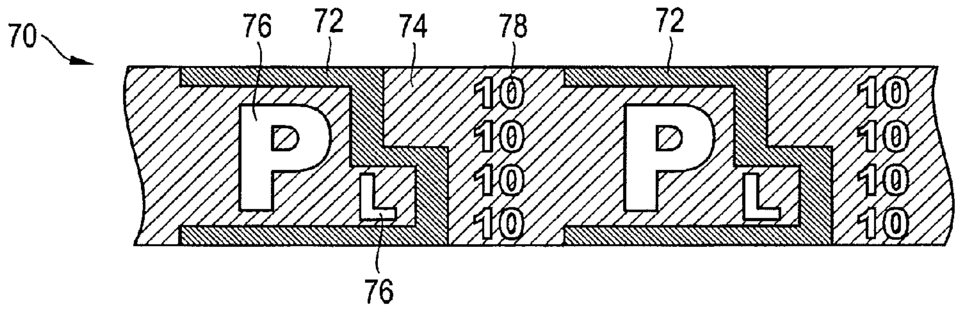
Figure 8:
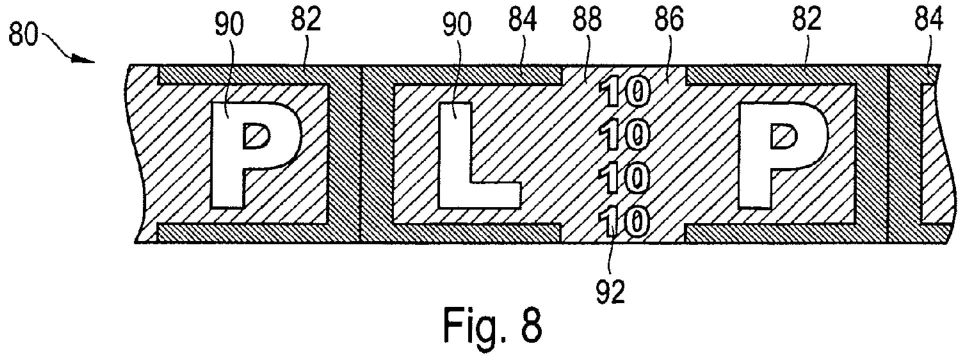
Figure 9:
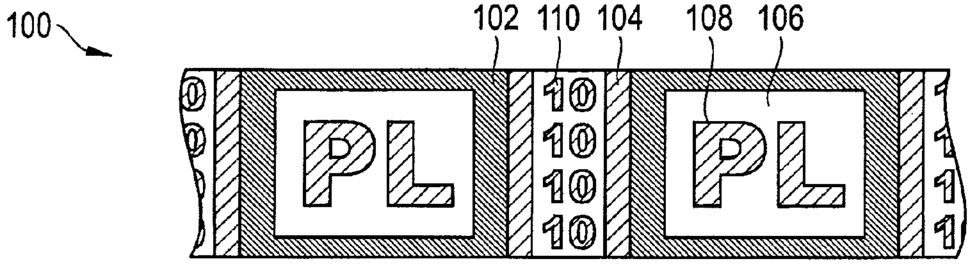
Figure 10:
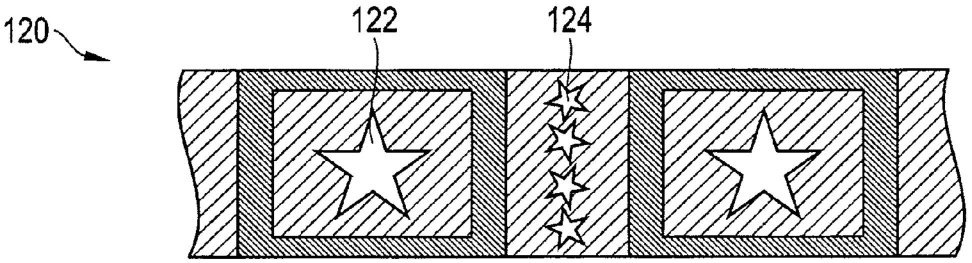
Figure 11:
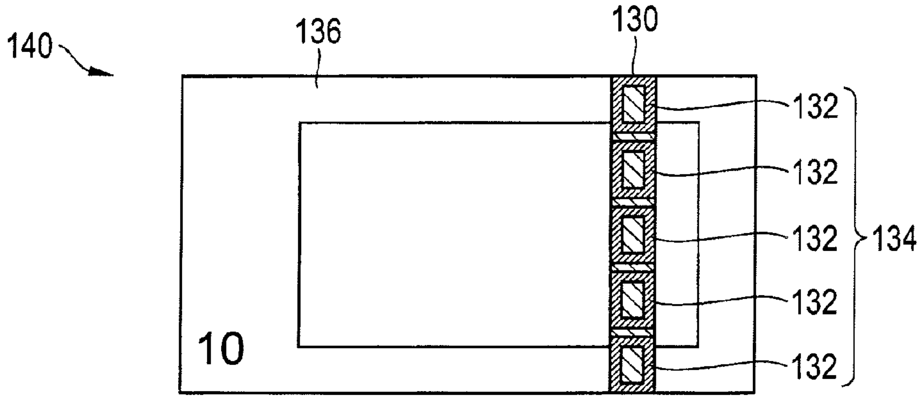

Shown are:

FIG. 1 a schematic diagram of a banknote having a security thread according to the present invention, FIGS. 2 and 3 two embodiments of security threads having magnetic information according to the background art, FIG. 4 a security thread according to an exemplary embodiment of the present invention, in top view FIG. 5 the security thread in FIG. 4, in cross section along the line V-V, FIG. 6 a security thread according to a further exemplary embodiment of the present invention that includes, in place of closed magnet frames, frame-shaped magnet elements that are open in some regions, FIGS. 7 and 8 two further exemplary embodiments of the present invention having frame-shaped magnet elements that are open in some regions, FIGS. 9 and 10 two further exemplary embodiments of the present invention that illustrate further variants of the see-through regions, and FIG. 11 a further exemplary embodiment of the present invention, in which the support to which the frame-shaped magnet elements are applied is itself not part of the security element.

The invention will now be explained using the example of security elements for banknotes. For this, FIG. 1 shows a schematic illustration of a banknote 10 having a window security thread 12 that emerges at certain window regions on the surface of the banknote 10, while it is embedded in the interior of the banknote 10 in the regions lying therebetween. The window security thread 12 includes machine-readable magnetic regions that exhibit outstanding detectability in both of the banknote transport directions used in the machine authenticity check.

The transport direction 14 in which the transport occurs longitudinally to the main axis of the thread is referred to as transverse transport since, here, the transport occurs in the transverse direction of the banknote 10. Accordingly, the transport direction 16 in which the transport occurs transverse to the main axis of the thread is referred to as longitudinal transport since, here, the transport occurs in the longitudinal direction of the banknote 10. In both cases, the banknote 10 is transported by a transport system past a magnet sensor that inductively or magnetoresistively reads out the magnetic information integrated in the security thread 12. As magnet sensors, often track-based sensors having a limited number of adjacent measuring tracks are used, such that, for a good readout result, there must not be any excessively large gaps in the magnetic information.

FIGS. 2 and 3 show, first, two known embodiments of machine-readable magnetic regions according to the background art. The security thread 20 in FIG. 2 exhibits two magnetic edge track strips 22 that are arranged on opposing longitudinal thread edges and separated from each other by magnet-free regions 24. In the authenticity check in transverse transport 14, the signal detection is improved by gaps 26 in the magnetic edge track strips 22 that produce an alternation of magnetic and non-magnetic regions and thus lead to a modulation of the detected signal.

In longitudinal transport 16, difficulties in signal detection by means of tracked magnet sensors are unlikely, due to the small gaps 26. In the magnet-free regions 24, inverse lettering 28 can be provided, the text height of the inverse lettering 28 being limited by the width of the magnetic edge track strip 22 and the printing tolerances.

The magnet design of the security thread 30 in FIG. 3 consists of a sequence of magnet blocks 32 that are separated from each other by magnet-free regions 34. In this embodiment, a piece of magnetic information in the magnet blocks 32 is easy to read out in transverse transport 14, since broad magnet surfaces 32 are available for the sensor, and the detected signal is modulated by the sequence of magnetic regions 32 and magnet-free regions 34. In the magnet-free regions 34, inverse lettering 36 can be provided whose text height is not limited by the presence of the magnetic layer 32. However, the relatively large gaps 34 between the magnet blocks 32 can lead to difficulties in readout in longitudinal transport 16, especially if tracked magnet sensors are used.

Inventive embodiments of security threads will now be described in greater detail by reference to FIGS. 4 to 11. In all embodiments according to the present invention, the security threads each include a plastic support foil having a longitudinal direction that corresponds to the main axis of the thread or the thread running direction, and, perpendicular to the longitudinal direction, a transverse direction. On the support foil is arranged a magnetic layer having a plurality of frame-shaped magnet elements that form machine-readable magnetic regions and that are arranged in succession along the longitudinal direction of the support foil.

A current particularly preferred embodiment of a security thread 40 according to the present invention is shown in FIG. 4 in top view and in FIG. 5 in cross section along the line V-V. In the security thread 40 is arranged on a transparent plastic support foil 42 a magnetic layer composed of a plurality of spaced-apart, closed magnet frames 44 that each occupy the entire width of the support foil (dimension perpendicular to the main axis of the thread). The magnet frames 44 are developed to be rectangular and exhibit only linear inner and outer borders. Here, the inner and outer borders extend exclusively parallel or perpendicular to the longitudinal direction of the thread. Adjacent magnet frames 44 are each separated from one another by narrow magnet-free regions 46.

The magnet frames 44 exhibit along the thread longitudinal direction a dimension of 5 mm to 40 mm, preferably of 8 mm to 20 mm, and in the thread transverse direction, a dimension of 2 mm to 6 mm, preferably of 3 mm to 4 mm. For the ridges 44-1 that extend along the main axis of the thread, the width of the ridges of the magnet frames 44 is between 0.1 mm and 1.5 mm, preferably between 0.2 mm and 0.4 mm, and for the ridges 44-2 that extend transverse to the main axis of the thread, between 0.1 mm and 4 mm, preferably about 1 mm. The remanent line flux of the magnet frames 44 is preferably between 120 nWb/m and 500 nWb/m.

Due to the inventive embodiment of the magnetic layer, particularly good detectability of the magnetic information is achieved both in readout in transverse transport 14 and in readout in longitudinal transport 16.

In transverse transport 14, the perpendicular frame struts 44-2 that run transverse to the main axis of the thread produce a greatly improved readout signal compared with known embodiments according to FIG. 2, since a larger magnet surface is available in the readout direction. In longitudinal transport 16, the gaps 46 can be executed to be significantly smaller than the gaps 34 in known embodiments according to FIG. 3, since the see-through regions are not limited to the gap regions 46, but rather can be, additionally or even exclusively, arranged within the magnet frames 44. The inventive embodiment in FIG. 4 thus produces a significantly improved readout signal compared with embodiments according to FIG. 3, especially when tracked magnet sensors are used. In this way, the overlap regions of sensors and magnet frames 44, which are necessary and must be taken into account in the thread design, can be kept smaller and the designer given greater design freedom.

In the exemplary embodiment in FIGS. 4 and 5, an opaque thin-film element 50 having a color-shift effect is further applied, for example vapor deposited in the PVD method, on the support foil 42 side opposite the magnet frames 44. Here, the layer structure of the thin-film element typically comprises, beginning from the support foil 42, a reflection layer, a dielectric intermediate layer and a semitransparent absorber layer. In other embodiments, however, in place of a color-shifting thin-film element, also another optically variable security element can be provided, for example a diffraction pattern, such as a hologram or an optically variable coating that exhibits a combination of color variable and color constant regions.

The thin-film element 50 is provided with gaps 52 in which the otherwise opaque thread structure is transparent or translucent, and that, when viewed in transmitted light, thus appear brightly shining as see-through regions, for example as inverse patterns 54, 56.

A portion of the gaps 52 forms inverse lettering 54 that is enclosed by the magnet frames 44 of the magnetic layer, as depicted in FIG. 4. Another portion of the gaps 52 forms an inverse pattern 56 that is arranged in the magnet-free regions 46 between the magnet frames 44, as likewise shown in FIG. 4. Since the inverse patterns 56 are arranged in magnet-free regions 46 of the security thread 40, they can occupy substantially the entire thread width and are, unlike with the thread design shown in FIG. 2, not limited by the ridge width of the magnet elements.

As depicted in the exemplary embodiment in FIG. 4, the inverse patterns 56 can be composed of small microcharacters 58 that exhibit a letter height of less than 1 mm, for example of about 0.6 mm. This is possible in the embodiments according to the present invention, since the microcharacters 58 of the inverse patterns 56 are present only in magnet-layer-free regions and thus form highly transparent regions within the security thread. This stands in contrast to other embodiments in which a largely, but necessarily not completely transparent magnet print is contiguously present on a security thread. In such embodiments, inverse patterns in a metalization or a color-shifting thin-film element always appear having a clearly perceptible gray veil, which makes the use of very small inverse patterns, such as the above-mentioned microcharacters, or the use of screened fonts very difficult or normally even impossible. Also in the embodiment in FIG. 2, the limitation by the two edge track strips 22 is too severe to be able to produce sufficiently large microcharacters.

FIG. 6 shows a further exemplary embodiment of the present invention, in which the security thread 60 includes, in place of closed magnet frames, frame-shaped magnet elements that are open in some regions 62. Each of the frame-shaped magnet elements 62 consists of a transverse ridge 62-2 that extends transverse to the main axis of the thread and, arranged alternately on the top and bottom thread edge, a longitudinal ridge 62-1 that extends along the main axis of the thread. The frame-shaped magnet elements 62 are connected without spacing and, in this way, form a continuous frame that is open alternatingly upward and downward, as shown in FIG. 6. For the lengths and widths of the ridges 62-1, 62-2, the specifications given for FIG. 4 apply accordingly.

Moreover, the security thread 60 exhibits an opaque thin-film element 64, of the kind already described in connection with FIG. 4, that is provided with gaps in the form of inverse lettering 66. Here, the frame-shaped magnet elements 62 are arranged around the inverse lettering 66 formed by the gaps, as illustrated in FIG. 6.

Also the open frame design in FIG. 6 forms a piece of magnetic information that exhibits outstanding detection performance both in transverse transport and in longitudinal transport. In transverse transport, the transverse ridges 62-2 produce a greatly improved readout signal compared with embodiments according to FIG. 2. Also in longitudinal transport, the readout signal is greatly improved compared with embodiments according to FIG. 3, since the alternatingly open frame design exhibits no gaps in the longitudinal direction.

The exemplary embodiments in FIGS. 7 and 8 show two further embodiments having frame-shaped magnet elements that are open in some regions. The security thread 70 in FIG. 7 includes a plurality of spaced-apart frame-shaped magnet elements 72 that each consist of multiple longitudinal and transverse ridges, all border lines running either perpendicular or parallel to the thread edges. The longitudinal or transverse ridges used can each exhibit the same width, as shown in FIG. 7, but in other embodiments, they can also exhibit different widths.

Besides the magnetic layer, the security thread 70 exhibits an optically variable security feature 74, in the exemplary embodiment a hologram, that is provided with gaps in the form of inverse lettering 76 and an inverse pattern 78. As illustrated in FIG. 7, the frame-shaped magnet elements 72 are arranged around the inverse lettering 76 formed by the gaps, while the inverse pattern 78 is arranged between the spaced-apart magnet elements 72 in magnet-free regions, and can thus extend substantially to the thread edges of the security thread 70.

With respect to the exemplary embodiments having inverse lettering and/or positive lettering disclosed in this application, it is also to be noted that, besides the examples shown in FIGS. 1 to 4 and 6 to 10, also still other embodiments are, of course, conceivable. For instance, the inverse lettering 76 composed of large and smaller letters “P” and “L” shown in FIG. 7 can also be designed such that the large letters form a first piece of information and the small letters a second piece of information. Here, it can be provided that the first piece of information is visually perceptible without auxiliary means and the second piece of information is visually resolvable with greater difficulty due to its smaller size compared with the first piece of information. Such embodiments are described in EP 0 659 587 B1, the disclosure of which is incorporated in the present application by reference.

For the security element according to the present invention, also embodiments can be used in which a first piece of information and a second piece of information are provided, the second piece of information being depicted as positive lettering and exhibiting the same form as the first piece of information, and the first and the second piece of information being arranged nested in such a way that the second piece of information exhibits unprinted surroundings. Such embodiments are disclosed in EP 0 930 174 B1, the disclosure of which is incorporated in the present application by reference.

The present invention is not limited to homogeneous magnet elements. For example, the security thread 80 shown in FIG. 8 includes a plurality of each of first and second frame-shaped magnet elements 82, 84 that are developed to be mirror images of each other. Between a second magnet element 84 and the adjacent first magnet element 82 is provided, in each case, a magnet-free region 86. In the exemplary embodiment, in each case, a first and a second magnet element 82, 84 touch each other without spacing, but in other embodiments, here, too, a magnet-free gap can be provided.

The security thread 80 further exhibits an optically variable security feature 88 that is provided with gaps in the form of inverse lettering 90 and an inverse pattern 92. The frame-shaped first and second magnet elements 82, 84 are each arranged around the inverse characters 90 formed by the gaps, while the inverse pattern 92 is arranged outside the magnet elements 82, 84 in a magnet-free region and extends substantially to the thread edges of the security thread 80.

Due to the transverse ridges of the frame-shaped magnet elements 72, 82, 84 and the narrow gaps between the adjacent magnet elements both in transverse transport and in longitudinal transport, the embodiments in FIGS. 7 and 8 exhibit outstanding detection performance. In the magnet-free regions, the height of the inverse patterns 78, 92 is limited only by the thread width. Also microcharacters or screened fonts can be used here, since no visually distracting background due to magnetic material is present in the region of the inverse patterns 78, 92.

FIG. 9 shows, according to a further exemplary embodiment of the present invention, a security thread 100 that exhibits a plurality of spaced-apart, closed magnet frames 102 of the kind already described for FIG. 4. The security thread 100 further includes an optically variable security feature 104 having gaps 106, with, in contrast to the embodiments in FIGS. 4 to 8, not the gaps forming the desired information, here the letter string "PL", but rather the opaque regions 108 of the security feature 104.

The opaque regions 108 can be, for example, regions of a metalization that were left standing in a demetalization step, or also a colored, opaque layer that is applied only in some regions. In the parlance of the present application, the letter string "PL" then depicts, not an inverse piece of information (as in FIGS. 4 to 8), but rather a positive piece of information. Here, it is to be emphasized that any reference to a positive or inverse piece of information is merely a convention, since of course also the gaps 106 follow the contours of the letter string "PL" and they thus exhibit, in the inverse depiction, the same information content as the opaque regions 108. In geometric or abstract patterns, it often can fundamentally not be unambiguously specified whether the pattern itself or the inverse pattern is a positive depiction or an inverse depiction.

Also the characters 110 arranged between the magnet frames 102 in magnet-free regions can be developed not only in inverse depiction, as shown, for example, in FIGS. 4, 7 and 8, but rather can also be a positive depiction of the desired information, here the denomination "10", as depicted in FIG. 9.

The exemplary embodiment 120 in FIG. 10 illustrates that the information depicted in the see-through regions can be not only alphanumeric character strings, but rather arbitrary patterns, such as the star shapes 122, 124 shown by way of example.

FIG. 11 shows a further exemplary embodiment of the present invention, in which the support 136 to which the frame-shaped magnet elements 132 are applied, is itself not part of the security element 130. It is understood that the region of the data carrier that is printed on with the frame-shaped magnet elements becomes, due to the printing, a part of the elongated security element according to the present invention. The elongated security element 130 in FIG. 11 is an imprinted security thread in which the magnetic layer 134 having the plurality of frame-shaped magnet elements 132 is imprinted directly on the data carrier substrate, especially a security paper 136 of a banknote 140. It is understood that, also in this variant of the present invention, the frame-shaped magnet elements 132 can be combined with further security features, such as gaps, see-through regions or optically variable security features, as already fundamentally described above.

The invention claimed is:

1. An elongated security element for security papers and value documents, having a longitudinal direction and, perpendicular to the longitudinal direction, a transverse direction, and having, arranged on a support, a magnetic layer that includes machine-readable magnetic regions, characterized in that the magnetic layer comprises a plurality of frame-shaped magnet elements that include the machine-readable magnetic regions, and that are arranged along the longitudinal direction of the elongated security element, the frame-shaped magnet elements form spaced-apart, closed magnet frames that are each arranged around further security features and enclose them.

2. The security element according to claim 1, characterized in that the frame-shaped magnet elements are developed to be rectangular having a linear inner and outer border.

3. The security element according to claim 1, characterized in that the borders of the frame-shaped magnet elements have borders that extend only parallel or perpendicular to the longitudinal direction of the elongated security element.

4. The security element according to claim 1, characterized in that the further security features are see-through regions having a piece of see-through information, especially inverse pattern regions and/or optically variable security features.

5. The security element according to claim 1, characterized in that the frame-shaped magnet elements exhibit a remanent line flux between 120 nWb/m and 500 nWb/m.

6. The security element according to claim 1, characterized in that the frame-shaped magnet elements exhibit, along the longitudinal direction, a ridge width between 0.1 mm and 1.5 mm, preferably between 0.2 mm and 0.4 mm, and exhibit, along the transverse direction, a ridge width between 0.1 mm and 4 mm, preferably of about 1 mm.

7. The security element according to claim 1, characterized in that outside the frame-shaped magnet elements are arranged visually perceptible characters, patterns or codes, especially visually perceptible see-through regions.

8. The security element according to claim 1, characterized in that the frame-shaped magnet elements are imprinted on a data carrier that itself is not part of the security element.

9. The security element according to claim 1, characterized in that the security element includes, as a support, a plastic support foil on which the frame-shaped magnet elements are arranged.

10. The security element according to claim 9, characterized in that the frame-shaped magnet elements occupy the entire width of the support foil in the transverse direction.

11. The security element according to claim 9, characterized in that the frame-shaped magnet elements are each arranged around further security features, and in that the frame-shaped magnet elements and the further security features are arranged on opposing sides of the support foil.

12. The security element according to claim 9, characterized in that outside the frame-shaped magnet elements are arranged visually perceptible characters, patterns or codes, especially visually perceptible see-through regions, that occupy substantially the entire width of the support foil in the transverse direction, especially in that the visually perceptible characters, patterns or codes exhibit, in the transverse direction of the support foil, a dimension that is greater than the width of the support foil minus twice the ridge width of the frame-shaped magnet elements along the longitudinal direction of the support foil.

13. The security element according to claim 1, characterized in that the security element forms a security thread, a security band or a security strip, or a security thread that is imprinted on a data carrier.

14. A method for manufacturing the elongated security element according to claim 1, in which a magnetic layer is arranged on a support, the magnetic layer being developed having a plurality of frame-shaped magnet elements that include the machine-readable magnetic regions, and that are arranged along the longitudinal direction of the elongated security element, and the frame-shaped magnet elements being developed as spaced-apart, closed magnet frames that are each arranged around further security features and enclose them.

15. The method according to claim 14, in which the magnetic layer having the plurality of frame-shaped magnet elements is imprinted on a data carrier that itself is not part of the security element.

16. The method according to claim 14, having the method steps:

providing a plastic support foil having a longitudinal direction and, perpendicular to the longitudinal direction, a transverse direction, and arranging the magnetic layer having the plurality of frame-shaped magnet elements on the support foil.

17. The method according to claim 16, characterized in that the frame-shaped magnet elements and the further security features are arranged on opposing sides of the support foil.

18. A data carrier having the security element according to claim 1.

19. The data carrier according to claim 18, characterized in that the data carrier is a banknote or another value document, a passport, a certificate or an identification card.

20. The data carrier according to claim 18, characterized in that the data carrier is a continuous material.

* * * * *